US012562009B2

(12) United States Patent
Lee

(10) Patent No.: US 12,562,009 B2
(45) Date of Patent: Feb. 24, 2026

(54) APPARATUS FOR MONITORING VEHICLE AND SEVER, AND METHOD FOR MONITORING VEHICLE USING THE SAME

(71) Applicants: Hyundai Motor Company, Seoul (KR); Kia Corporation, Seoul (KR)

(72) Inventor: Pyoung Hwa Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 178 days.

(21) Appl. No.: 17/954,919

(22) Filed: Sep. 28, 2022

(65) Prior Publication Data

US 2023/0186693 A1 Jun. 15, 2023

(30) Foreign Application Priority Data

Dec. 15, 2021 (KR) ........................ 10-2021-0180048

(51) Int. Cl.

*G07C 5/00* (2006.01)
*B60W 50/02* (2012.01)
*B60W 50/08* (2020.01)
*G07C 5/08* (2006.01)

(52) U.S. Cl.

CPC ............. *G07C 5/008* (2013.01); *G07C 5/006* (2013.01); *G07C 5/0808* (2013.01)

(58) Field of Classification Search

CPC ...... G07C 5/008; G07C 5/006; G07C 5/0808; G07C 5/0841; B60W 50/04; B60W 50/0205; B60W 50/08; B60W 2050/021; B60W 2556/45; G06Q 50/40

USPC ........................................................ 701/31.4

See application file for complete search history.

(56) References Cited

U.S. PATENT DOCUMENTS 6,766,232 B1 7/2004 Klausner
6,850,823 B2 2/2005 Eun et al.
8,543,282 B2 9/2013 Hansson et al.
9,846,979 B1 * 12/2017 Sainaney ............. G07C 5/0808
10,723,281 B1 * 7/2020 Briggs ..................... G01S 7/497
10,872,479 B1 * 12/2020 Martin ................... G07C 5/085
2006/0109139 A1 5/2006 Katsuta et al.
2018/0005199 A1 * 1/2018 Abuelsaad ........... G06Q 30/018
2018/0365772 A1 * 12/2018 Thompson ............. G06Q 40/08
2021/0024224 A1 * 1/2021 Mohan ................. G07C 5/0808
2021/0216848 A1 * 7/2021 Poghosyan ......... G06F 11/3006
2021/0306361 A1 * 9/2021 Tanaka ................ H04L 63/1416
2021/0349997 A1 * 11/2021 Hirano .................. G06F 21/316
2023/0186693 A1 * 6/2023 Lee ........................ G07C 5/006
701/31.4

FOREIGN PATENT DOCUMENTS

JP H08-241121 A 9/1996
KR 10-2007-0060712 A 6/2007
KR 10-2011-0058443 A 6/2011

* cited by examiner

*Primary Examiner* — Tyler D Paige
(74) *Attorney, Agent, or Firm* — Fox Rothschild LLP

(57) ABSTRACT

Disclosed are an apparatus and a server for monitoring a vehicle, and a method for monitoring a vehicle using the same. According to an aspect of the present disclosure, the vehicle monitoring apparatus comprises a terminal task that is configured to detect an event caused by an anomaly sign in the vehicle, and a terminal log manager configured to collect event status data comprising an error level in response to detecting the event, and configured to transmit a log matched with the event in response to a log transmission request.

12 Claims, 7 Drawing Sheets

APPARATUS FOR MONITORING VEHICLE AND SEVER, AND METHOD FOR MONITORING VEHICLE USING THE SAME

CROSS-REFERENCE TO RELATED APPLICATION

This application claims, under 35 U.S.C. § 119(a), the benefit of priority to Korean Patent Application No. 10-2021-0180048, filed in the Korean Intellectual Property Office on Dec. 15, 2021, the disclosure of which is incorporated herein by reference in its entirety.

BACKGROUND

Technical Field

Embodiments of the present disclosure relate to an apparatus for monitoring a vehicle and a sever, and method for monitoring a vehicle using the same, and more particularly, relates to a technology capable of responding to an anomaly sign in a vehicle more quickly and efficiently.

Description of the Related Art

To improve problems such as errors and defects occurring in vehicles, the operation of identifying and analyzing the log of a vehicle system may be used. For example, when a problem occurs in a vehicle, a method of extracting a system log and analyzing the extracted log may be used.

As such, in the conventional art, after problems of a vehicle are identified, the problems of the vehicle are dealt with, and the time to identify the problems of the vehicle is the time when a user recognizes the problem. That is, after a fatal problem that can be recognized by the user occurs, it is common to start to deal with the problem. Accordingly, there is a tendency for the response to problems occurring in the vehicle to be delayed.

Also, to check the system log, it is necessary to extract the system log. Conventionally, the log is extracted by connecting a removable storage device to the system and copying the system log to a removable storage device. Accordingly, there are many cases where it is difficult to extract a log of a vehicle that has already been sold, and the log extraction time is delayed. Since the time of log extraction is delayed, there are many cases in which important logs before log extraction are deleted.

SUMMARY

The present disclosure has been made to solve the above-mentioned problems occurring in the existing technologies while advantages achieved by the prior art are maintained intact.

An exemplary embodiment of the present disclosure is to provide an apparatus and a server for monitoring a vehicle that can identify an anomaly sign in a vehicle earlier, and a method for monitoring a vehicle using the same.

In addition, an exemplary embodiment of the present disclosure is to provide an apparatus and a server for monitoring a vehicle capable of confirming an anomaly sign in a vehicle in a more convenient manner, and a method for monitoring a vehicle using the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle monitoring apparatus may comprise a terminal task configured to detect an event caused by an anomaly sign in a vehicle, and a terminal log manager configured to collect event status data comprising an error level in response to detecting the event, and configured to transmit a log matched with the event in response to a log transmission request.

According to an exemplary embodiment, the terminal task may be configured to detect the event based on a user input through a user input device.

According to an exemplary embodiment, the terminal log manager may be configured to request the event status data from a user after confirming the user input.

According to an exemplary embodiment, the terminal task, when a preset generation condition occurs, may be configured to detect an occurrence of the event matched with the generation condition.

According to an exemplary embodiment, the terminal log manager may be configured to search a table and may be configured to identify the error level matched with the event and the generation condition.

According to an exemplary embodiment, the terminal log manager may be configured to transmit the log to an external server when the error level is greater than or equal to a threshold value.

According to an aspect of the present disclosure, a server for monitoring a vehicle includes a log manager that receives event status data including an error level of an event when the event occurs due to an anomaly sign in the vehicle, and determines whether to collect a log matched with the event based on the error level, and an issue report generator that generates an issue report based on the log collected by a monitoring device.

According to an exemplary embodiment, the log manager may be configured to request the vehicle to transmit the log based on that a size of the log is less than a preset threshold size.

According to an exemplary embodiment, the log manager may be configured to request the vehicle to transmit the log when a generation history of the issue report does not exist.

According to an exemplary embodiment, the log manager may be configured to request the vehicle to transmit the log based on that version information related to the log is supported.

According to an aspect of the present disclosure, a method of monitoring of a vehicle may comprise detecting an event caused by an anomaly sign in the vehicle, collecting event status data including an error level in response to detecting the event, determining whether to collect a log matched with the event, based on the error level, and generating an issue report, based on the collected log.

According to an exemplary embodiment, the detecting of the event may be performed based on confirming a user input from a user.

According to an exemplary embodiment, the collecting of the event status data may comprise requesting information related to the event status data from the user after confirming the user input.

According to an exemplary embodiment, the detecting of the event, when a preset generation condition occurs, may further comprise detecting an occurrence of the event matched with the generation condition.

According to an exemplary embodiment, the collecting of the event status data may comprise identifying the error level matched with the event and the generation condition.

According to an exemplary embodiment, the determining whether to collect the log may comprise collecting the log when the error level is greater than or equal to a threshold value.

According to an exemplary embodiment, the collecting of the event status data may comprise collecting information related to a size of the log, and the determining whether to collect the log may comprise restricting the log collection based on the the size of the log is greater than or equal to a preset threshold size.

According to an exemplary embodiment, the collecting of the event status data may comprise collecting information on a generation history of the issue report related to the event, and the determining whether to collect the log may comprise restricting the log collection based on an existence of the generation history of the issue report.

According to an exemplary embodiment, the collecting of the event status data may comprise identifying version information related to the log, and the determining whether to collect the log may comprise restricting the log collection based on that version information related to the log is not supported.

According to an exemplary embodiment, the determining whether to collect the log may comprise requesting the vehicle to transmit the log from a server external to the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
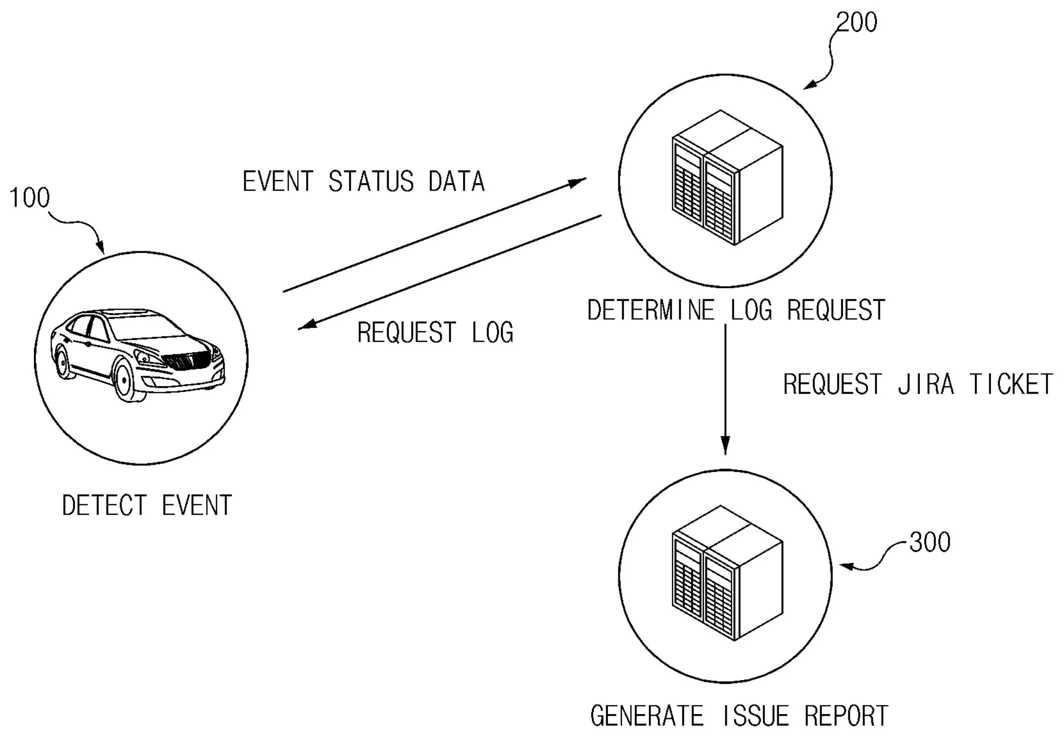
FIG. 1 is a diagram describing an outline of a vehicle monitoring system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 7.

FIG. 1 is a diagram describing an outline of a vehicle monitoring system according to an exemplary embodiment of the present disclosure.

Referring to FIG. 1, a vehicle monitoring system according to an exemplary embodiment of the present disclosure may comprise a vehicle 100, a first server 200, and a second server 300.

The vehicle 100 may be configured to detect an event caused by an anomaly sign and may be configured to generate event status data related to the event. The vehicle 100 may be configured to detect an event according to a preset condition as well as a user input. The event status data may comprise an error level of the event. The vehicle 100 may be configured to transmit the event status data to the first server 200. The first server 200 may be configured to determine whether to collect a log based on the event status data, and may be configured to request a log from the vehicle 100 based on the determination of log collection. The first server 200 may be configured to request a JIRA ticket for generating an issue report from the second server 300 based on the log provided from the vehicle 100.

The second server 300 may be configured to generate the JIRA ticket, and may be configured to generate the issue report based on the log received from the first server 200.

As briefly described on the basis of FIG. 1, the vehicle monitoring system according to an exemplary embodiment of the present disclosure may be configured to detect an anomaly sign of a vehicle more quickly because anomaly signs are not detected only by the user input.

In addition, since the vehicle monitoring system according to an exemplary embodiment of the present disclosure does not detect a vehicle log using a removable storage device, log extraction may be easier.

In addition, since the vehicle monitoring system according to an exemplary embodiment of the present disclosure determines whether to collect the log based on an error level and the event status data, unnecessary log collection may be prevented. Since unnecessary log collection does not proceed, communication overload between the first server 200 and the vehicle 100 may be prevented from occurring, and the capacity of the database of the first server 200 may be prevented from becoming excessively large.

Figure 2:
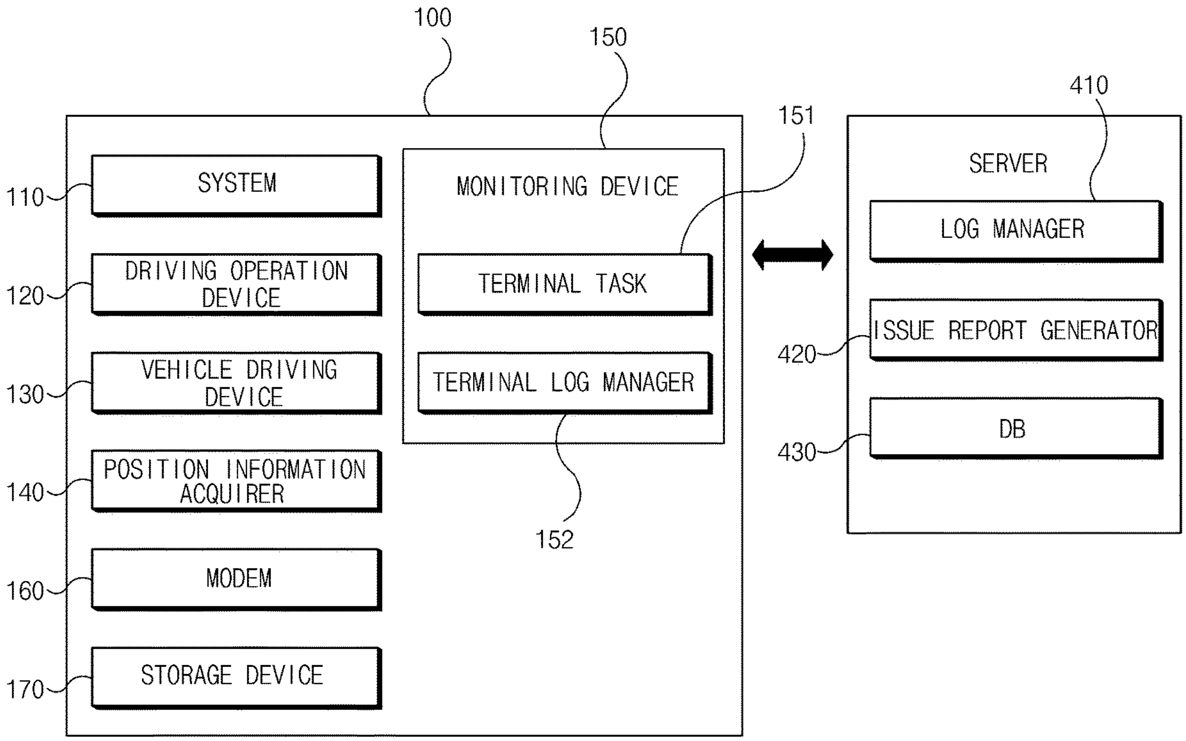
FIG. 2 is a block diagram illustrating a configuration of a vehicle monitoring system according to an exemplary embodiment of the present disclosure.

FIG. 2 is a block diagram illustrating a configuration of a vehicle monitoring system according to an exemplary embodiment of the present disclosure. The first server 200 and the second server 300 illustrated in FIG. 1 may be integrated into one server as illustrated in FIG. 2.

Referring to FIG. 2, the vehicle 100 in the vehicle monitoring system according to an exemplary embodiment of the present disclosure may comprise a system 110, a driving operation device 120, a vehicle driving device 130, a position information acquirer 140, a monitoring device 150, a modem 160, and a storage device 170.

The system 110 may be a system in which electronic devices are integrated for user convenience. For example, the system 110 may be a system including audio-video-navigation-telematics (AVNT) and the like.

In more detail, the system 110 may be configured to provide functions such as phone menu, driving information menu, phone projection menu, radio menu, media menu, USB video menu, map menu, navigation menu, setting menu, favorite menu, voice memo menu, DMB menu, and the like.

The system 110 may comprise a user input device for receiving a user input and a microphone for obtaining voice information from a user. The user input device may be in the form of a button, and may be implemented with a user interface in which a display and a touch panel are combined. In an exemplary embodiment of the present disclosure, the user input device may be configured to receive a user input for notifying an event related to an anomaly sign of a vehicle. The microphone is a device for acquiring voice information from a user, and in an exemplary embodiment of the present disclosure, the microphone may be configured to acquire event status data from the user.

The driving operation device 120 is a device that receives a user input for driving. The driving operation device 120 may comprise a steering input device such as a steering wheel, an accelerator pedal, and a brake pedal.

The vehicle driving device 130 may be configured to control various vehicle driving devices in the vehicle, and may comprise a power train driving device, a chassis driving device, a door/window driving device, a safety component driving device, a lamp driving device, and an air conditioning driving device. The power train driving device may comprise a power source driving device and a transmission driving device. The chassis driving device may comprise a steering driving device, a brake driving device, and a suspension driving device. The safety component driving device may comprise a seat belt driving device for seat belt control. The vehicle driving device 130 may comprise an Electronic Control Unit (ECU).

The position information acquirer 140 may be configured to generate position data of the vehicle. The position information acquirer 140 may comprise at least one of a Global Positioning System (GPS) and a Differential Global Positioning System (DGPS). The position information acquirer 140 may be configured to generate position data based on a signal generated from at least one of GPS and DGPS. The position information acquirer 140 may be referred to as a Global Navigation Satellite System (GNSS).

The monitoring device 150 may be configured to detect the occurrence of an event, and may acquire event status data based on the generated event.

To this end, the monitoring device 150 may comprise a terminal task 151, and a terminal log manager 152.

The terminal task 151 may be configured to detect an event generated by an anomaly sign of the vehicle. The terminal task 151 may be configured to detect an event based on a user input. Alternatively, the terminal task 151 may be configured to detect an event occurring according to a preset condition. The terminal task 151 may be configured to generate a report according to the detected event and may be configured to notify the occurrence of the event to the terminal log manager 152.

The terminal log manager 152 may be configured to collect event status data including an error level, based on the report received from the terminal task 151. The terminal log manager 152 may be configured to collect the log matched with the event and may be configured to transmit the log to a server 400.

The modem 160 may be configured to communicate with the server 400 by modulating a digital signal into an analog signal to transmit, and demodulating a received analog signal to a digital signal. The modem 160 may be configured to transmit/receive a radio signal with at least one of a base station, an external terminal, and a center through a mobile communication network constructed based on technology standards or communication method (e.g., a GSM (Global System for Mobile communication), a CDMA (Code Division MultiAccess), a CDMA2000 (Code Division Multi Access 2000), an EV-DO (Enhanced Voice-Data Optimized or Enhanced Voice-DataOnly), a WCDMA (Wideband CDMA), a HSDPA (High Speed Downlink Packet Access), a HSUPA (High Speed Uplink PacketAccess), an LTE (Long Term Evolution), an LTE-A (Long Term Evolution-Advanced), etc.) for mobile communication. The radio signal may comprise various types of data according to transmission/reception of a voice call signal, a video call signal, or a text/multimedia message.

The storage device 170 may be configured to store a table in which an event and a generation condition are matched. In the table stored in the storage device 170, an error level matched with an event and a generation condition may be stored. The storage device 170 may be composed of a non-volatile memory such as a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), etc., and/or a volatile memory such as a dynamic random access memory (DRAM), a synchronous dynamic random access memory (SDRAM), a double date rate-SDRAM (DDR-SDRAM), etc., or a combination thereof.

The server 400 may comprise a log manager 410, an issue report generator 420, and a database (DB) 430.

The log manager 410 may be configured to receive event status data and may be configured to determine whether to collect the log based on an error level of the event status data. Alternatively, the server 400 may be configured to determine a log collection restriction condition based on the event status data, and may be configured to reject log reception when there is the log collection restriction condition.

The issue report generator 420 may be configured to generate an issue report related to the event based on the log provided from the vehicle 100. The issue report may comprise the event status data.

The database 430 may be configured to provide a space in which an issue report matching a log is stored.

Figure 3:
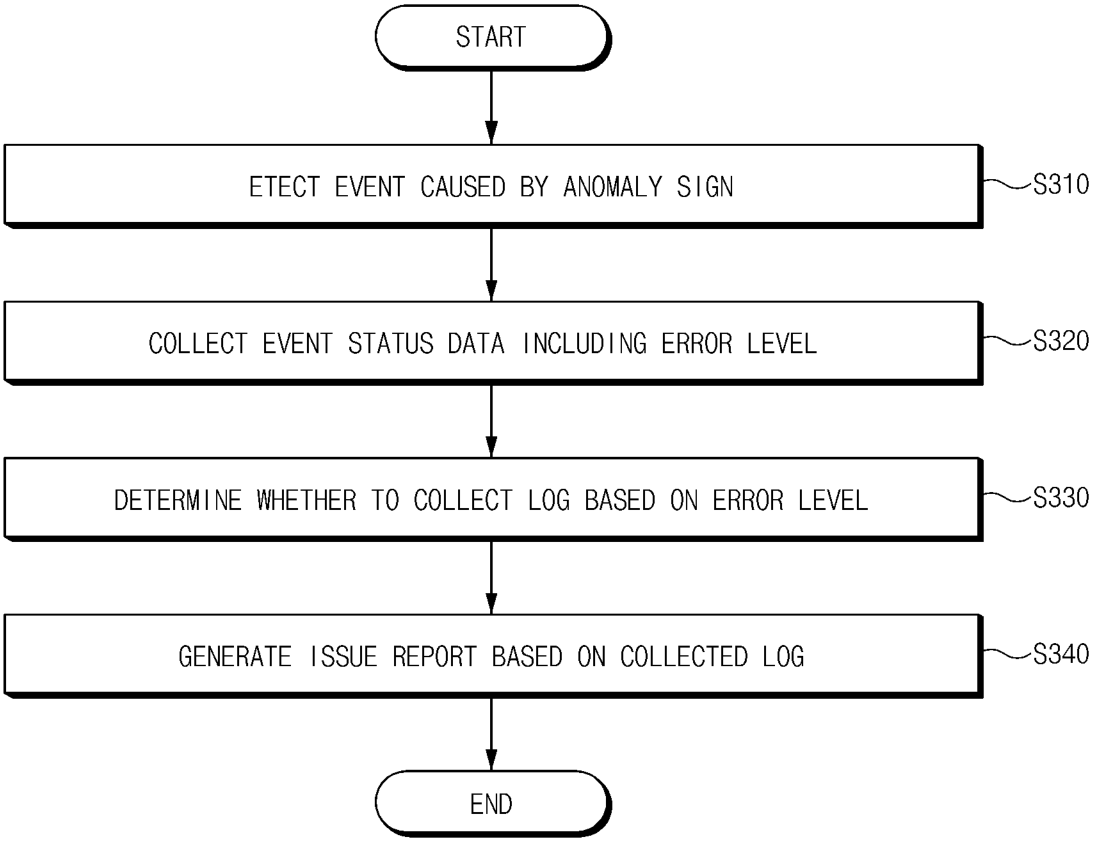
FIG. 3 is a flowchart describing a vehicle monitoring method according to an exemplary embodiment of the present disclosure.

FIG. 3 is a flowchart describing a vehicle monitoring method according to an exemplary embodiment of the present disclosure. The vehicle monitoring method according to the embodiment of the present disclosure with reference to FIG. 3 will be described as follows.

In first step (S310), it is possible to detect an event caused by an anomaly sign of a vehicle.

The terminal task 151 may be configured to detect an event in a manual report manner or an automatic report manner.

The manual report may mean an event detected based on a user input received through the user input device of the system 110.

The automatic report may mean an event detected according to a preset generation condition. The automatic report may be generated based on the occurrence of an anomaly sign corresponding to a generation condition in a protocol, system, or application. To this end, the generation condition is predefined, and a table in which the generation condition and the event are matched may be stored in the storage device 170. In addition, the table may comprise a log that matches generation conditions and events.

In second step (S320), in response to detecting an event, event status data including an error level may be collected.

The terminal log manager 152 may be configured to collect the event status data in response to the event detected by the terminal task 151. The event status data may be composed of fields including detailed information related to the event.

The event status data may comprise an error level of the event. The error level of an event according to an exemplary embodiment may comprise a first level to a fourth level. The first level may be an error level for an event related to usability improvement information, and may be referred to as an 'info'. The second level may be an error level for an event related to the driving of the vehicle and some function of the system, and may be referred to as a 'warn'. The third level may be an error level of an event related to some function of a system or some function of an application, and may be referred to as an 'error'. The fourth level may be an error level for an event related to major functions and operations of the system, and may be referred to as a 'critical'.

In addition, the event status data may comprise information on a size of the log matched with the event status data and history information of the issue data generated based on the log.

In third step (S330), based on the error level, it is possible to determine whether to collect a log matched with the event. The collection of the log in third step (S330) may be data for generating an issue report, which will be described later. According to an exemplary embodiment, the issue report generation may be performed by the server 400. The terminal log manager 152 may be configured to primarily collect the log matched with the event. Also, the server 400 may be configured to generate an issue report based on the log provided from the terminal log manager 152.

According to an exemplary embodiment, determining whether to collect the log may be a step in which the terminal log manager 152 determines whether to transmit the log to the server 400. When the error level is greater than or equal to the threshold level, the terminal log manager 152 may be configured to collect the log corresponding to the corresponding error level. According to an exemplary embodiment, the error level may be set to the third level.

According to another embodiment, the determining whether to collect the log may be a step in which the server 400 determines whether to request the terminal log manager 152 to transmit the log. The server 400 may be configured to determine a log collection restriction condition based on the event status, and reject the log collection when the log collection restriction condition exists. In other words, the server 400 may be configured to request log transmission from the terminal log manager 152 only when there is no log collection restriction condition. A specific embodiment of the log collection restriction condition will be described later.

In fourth step (S340), an issue report may be generated based on the collected log.

The server 400 may be configured to collect the log for the event of which the error level is the third level or the fourth level. And, the server 400 may be configured to generate the issue report based on the collected log.

Figure 4:
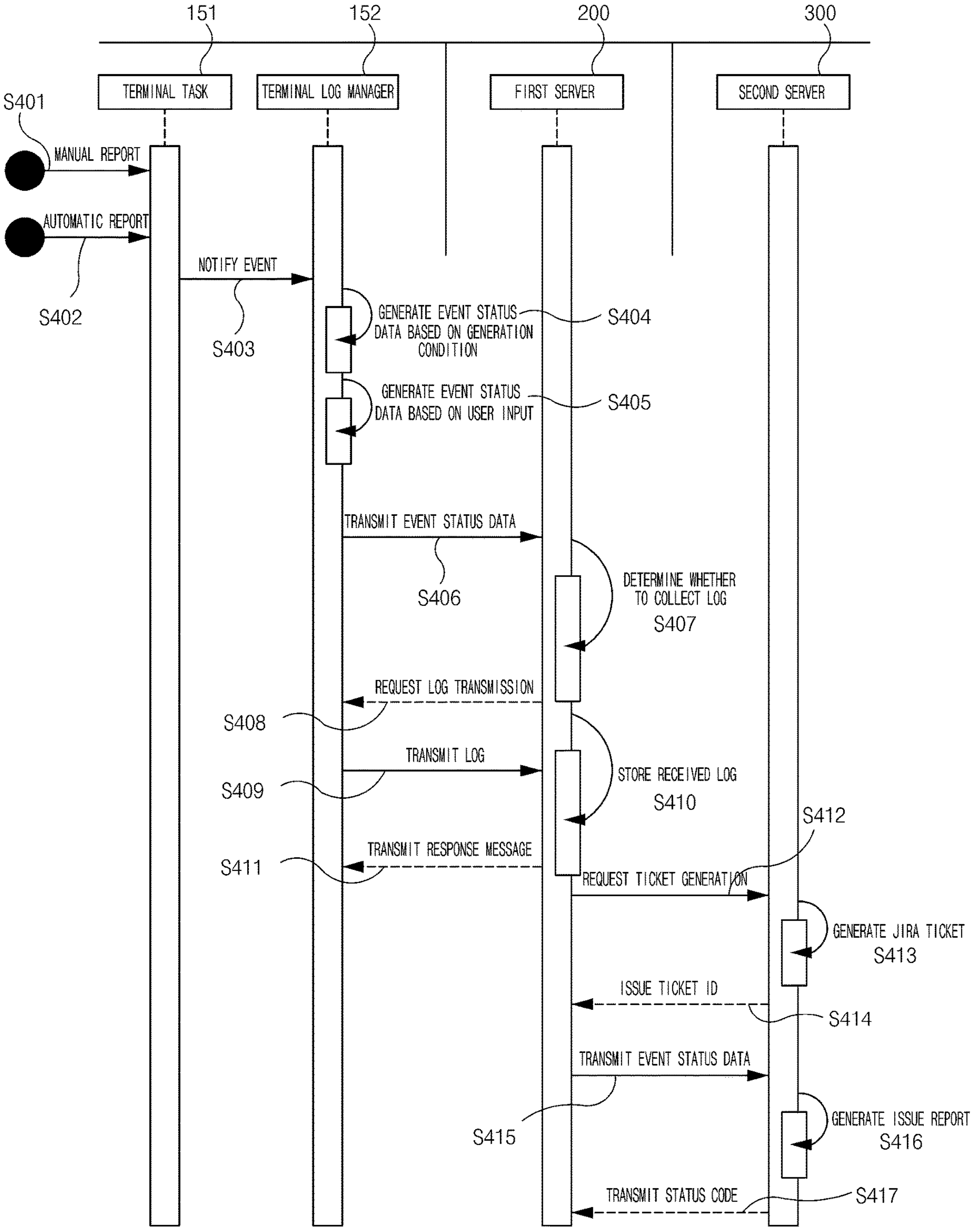
FIG. 4 is a flowchart describing a vehicle monitoring method according to another embodiment of the present disclosure.

FIG. 4 is a flowchart describing a vehicle monitoring method according to another embodiment of the present disclosure. The vehicle monitoring method according to another embodiment of the present disclosure with reference to FIG. 4 will be described as follows.

In S401 and S402, the terminal task 151 may be configured to detect an event. S401 indicates event detection by manual report, and S402 indicates an event detection procedure by automatic report. Event detection may be identified through at least one of S401 and S402.

In S401, the terminal task 151 may be configured to detect the occurrence of an event based on a user input received through the user input device. When an anomaly sign of the vehicle occurs, the user may input the event occurrence through the user input device.

The manual report input through the user input device may comprise receiving event status information from the user. To this end, when a manual report from the user input device is detected, the terminal task 151 may be configured to request event status information from the user. The event status information may be information for generating event status data. The terminal task 151 may be configured to receive the event status information through a microphone or a user interface of a head unit.

In S402, the terminal task 151 may be configured to detect the occurrence of an event based on the generation condition. In more detail, the event generation condition are as follows.

[Table 1] to [Table 3] below are tables indicating an event and a generation condition. Referring to [Table 1] to [Table 3], the event may comprise a protocol-related event, a system-related event, and an application-related event.

[Table 1] is a table indicating the protocol-related event.

TABLE 1

| Division | Event | Condition | Log | Tx time | Level |
|---|---|---|---|---|---|
| protocol | request | request vehicle log | sever request | instant | info |
| | user | manual report of user through user input | kernel<br>app<br>system | instant | critical |

Referring to [Table 1], the protocol-related event may comprise a 'request' and a 'user'.

The generation condition of the 'request' may be a log request from the server. The log of the request event is a 'server request', and the error level may be set to 'info'.

The generation condition of the 'user' may be a user input. The log of user event may comprise kernel, app, and system, and the error level may be set to the 'critical'.

[Table 2] is a table indicating an event related to the system.

TABLE 2

| Division | Event | Condition | Log | Tx time | Level |
|---|---|---|---|---|---|
| System | termination | program termination | backtrace<br>signal<br>kernel<br>compositor (weston)<br>app | termination | error |
| | booting | reboot<br>boot failure<br>boot delay | lifecycle<br>service<br>app | instant/next boot | critical |
| | screen | black screen<br>freeze screen<br>screen update delay | lifecycle<br>compositor (weston) | instant/ termination | critical |
| | resource | resource threshold exceeded<br>OOM (Out Of Memory) | resource<br>Guider<br>top<br>nvutils<br>pmem,<br>kernel | instant/ termination | warn |
| | freezing | deadlock state<br>communication delay between programs | app<br>lifecycle | instant/ termination | critical |
| | network | communication failure (shaded area)<br>communication failure (program) | CCU<br>DCU | termination | info |
| | security | fingerprint recognition failure<br>administrator privilege takeover | kernel<br>system | instant/next boot | error |

TABLE 2-continued

| Division | Event | Condition | Log | Tx time | Level |
|---|---|---|---|---|---|
| | controller | controller error | controller signal | instant/ termination | error |
| | OTA | OTA failure | OTA | instant | critical |

Referring to [Table 2], the system-related event may comprise termination, booting, screen, resource, freezing, network, security, controller, and OTA.

The termination may be an event generated based on abnormal termination of a program in the system. The log of the termination event may comprise backtrace, signal, kernel, compositor (weston), and app, and the error level may be set to an 'error'.

The booting may be an event generated when a system booting error occurs. The log of the booting event may comprise a lifecycle matching a reboot issue, a service matching a screen freeze state, and an app matching a boot delay. The error level of the booting event may be set to the 'critical'.

The screen may be an event generated by a display abnormality of the head unit of the system. The log of the screen event may comprise a lifecycle that matches the occurrence of a black screen, and a compositor (weston) that matches the screen freeze. The error level of the screen may be set to the 'critical'.

The resource may be an event related to an anomaly sign occurring in the storage device 170 of the system. The log of the resource event may comprise resource, Guider, top, nvutils, pmem, and kernel. The error level of the resource event may be set to the 'warn'.

Freezing may be an event caused by a communication error between programs in the system. The log of the freezing event may comprise the 'app' matching deadlocks in communication and the 'lifecycle' matching delays in communication between programs. The error level of the freezing event may be set to the 'critical'.

The network may be an event caused by an anomaly sign in the communication network. The log of the network event may comprise a CCU corresponding to the communication failure due to the transliteration region, and a DCU corresponding to the communication failure between programs. The error level of the network event can be set to the 'info'.

The security may be an event related to user management. The log of the security event may comprise a kernel matching fingerprint recognition failure, a system matching an administrator privilege takeover, and a controller signal matching a controller error.

The controller may be an event related to the controller error, and may be matched with a controller signal log. The error level of the controller event may be set to the 'error'.

The OTA may be an event related to the occurrence of an error in the over-the-air update. The OTA event may be matched with the OTA, and the error level may be set to the 'critical'.

[Table 3] is a table indicating the application-related event.

TABLE 3

| Division | Event | Condition | Log | Tx time | Level |
|---|---|---|---|---|---|
| App | navigation | route search failure<br>search failure<br>traffic information<br>reception failure<br>center communication<br>failure<br>file storage failure<br>map matching error | app | termination | error |
| | voice recognition | STT failure<br>3 or more rejections<br><br>TTS failure | PhoneBook DB<br>VR Data<br>Production Data | termination | info |
| | pothole | pothole detection | camera stream<br>Traffic data | termination | info |
| | split screen | program response time out | app | termination | error |

Referring to [Table 3], the application-related event may comprise navigation, voice recognition, pothole, and split screen.

The navigation event may be an event related to a navigation error of the system. The navigation event may be generated when route search failure, search failure, traffic information reception failure, center communication failure, file storage failure, map matching error, etc. are detected. The navigation event matches the log app, and the error level can be set to the 'error'.

The voice recognition event may be an event related to a user voice recognition error. The log of the voice recognition event may comprise PhoneBook DB that matches STT failure, and VR Data Production Data that matches with an issue in which rejection occurs more than a specific number of times. The error level of the voice recognition event may be set to the 'info'.

The pothole event may be an event related to a pothole, the log of the pothole event may comprise a camera stream and traffic data, and the error level may be set to the 'info'.

The split screen event may be an event caused by an error related to the display function of the head unit. The log of the split screen event may comprise the 'app' matched with the program response timeout, and the error level may be set to the 'error'.

As may be seen from [Table 1] to [Table 3], the log transmission time for each event may be different. The log transmission time may vary depending on resources available to the system, communication status, or data collection service operation status.

In S403, the terminal task 151 may be configured to notify the terminal log manager 152 of the occurrence of an event. In response to event detection, the terminal task 151 may be configured to transmit an event name and a generation condition matched with the event name to the terminal log manager 152. For example, when a termination event occurs due to program termination, the terminal log manager 152 may be configured to transmit an event name "end" and the generation condition "program termination" matched with the event name to the terminal log manager 152.

In S404, the terminal log manager 152 may be configured to generate event status data.

The terminal log manager 152 may be configured to create the event status data based on the event detection result. The event status data may comprise log size and issue report generation history. In addition, the event status data may be composed of fields including information on protocol, event, machine, CCS, GPS, version, perf, and features. Hereinafter, embodiments of event status data generated by the terminal log manager 152 will be described with reference to [Table 4] to [Table 11].

[Table 4] to [Table 11] are tables specifically showing the field of the event status data.

[Table 4] is a table indicating protocol information of the field.

TABLE 4

| | Field | Description | Attribute |
|---|---|---|---|
| protocol | version | protocol version | mandatory |
| | config | applied config content | mandatory |
| | logsize | Logsize | optional |
| | compress | log compress format | optional |
| | jira | jira title | optional |

Referring to [Table 4], the protocol information of the field is data for communication between the vehicle and the server, and may comprise version, config, log size, compress, and jira.

The version may comprise protocol version information, and may be information necessarily included in the field.

The config may comprise the contents of the applied 'config', and may be information necessarily included in the field.

The logsize may comprise information on the size of a log, and may be information selectively included in the field.

The compress may comprise information on the compression format of the log, and may be information selectively included in the field.

The jira may comprise information associated with the jira title, and may be information selectively included in the field.

[Table 5] is a table indicating the event information of the field.

TABLE 5

| | Field | Description | Attribute |
|---|---|---|---|
| event | type | event name | mandatory |
| | desc | event details | mandatory |
| | level | error level | mandatory |
| | time | system standard time | mandatory |
| | uptime | system operating time | mandatory |
| | applist | running application list | mandatory (Other)<br>optional (initialization) |

Referring to [Table 5], the event information of the field may comprise the contents of the event detected by the terminal task 151, and may comprise type, desc, level, time, uptime, and applist.

The type may comprise event name information and may be information necessarily included in the field.

The desc may comprise details of an event, and may be information necessarily included in the field.

The level may comprise error level information and may be information necessarily included in the field.

The time may comprise standard time information of the system, and may be information necessarily included in the field.

The uptime may comprise system operating time information and may be information necessarily included in field information.

The applist includes list information of a running application (app). The applist may be selectively included in the field information during initialization, and may be necessarily included in the field information in a process other than the initialization.

[Table 6] is a table indicating machine information of the field.

TABLE 6

| | Field | Description | Attribute |
|---|---|---|---|
| machine | hashvin | encrypted vehicle number | mandatory |
| | vehicle | applicable vehicle type name | mandatory |
| | platform | applicable platform name | mandatory |
| | region | applicable country | mandatory |

Referring to [Table 6], the machine information of the field may comprise information about the vehicle in which the monitoring device 150 is installed, and may comprise hashvin, vehicle, platform, and region.

The hashvin may be encrypted vehicle number information, and may be information necessarily included in the field.

The vehicle may be information indicating the type of a vehicle, and may be information necessarily included in the field.

The platform may be information indicating the name of the platform of a vehicle, and may be information necessarily included in the field.

The region may comprise country information in which the vehicle is located, and may be information necessarily included in the field.

[Table 7] is a table indicating CCS information of the field.

TABLE 7

| | Field | Description | Attribute |
|---|---|---|---|
| CCS | number | connected number | mandatory |
| | usim | USIM | mandatory |
| | Imei | IMEI | mandatory |

Referring to [Table 7], the CCS information of the field means information related to the opening of a connected car service, and may comprise number, usim, and imei.

The number may comprise connected number information, and may be information necessarily included in the field.

The usim may be USIM information of a vehicle, and may be information necessarily included in the field.

The imei may be International Mobile Station Equipment Identity (IMEI) information, and may be information necessarily included in the field.

[Table 8] is a table indicating GPS information of the field.

TABLE 8

| | Field | Description | Attribute |
|---|---|---|---|
| gps | lat | latitude SOPS DB column type = varchar2(11) | mandatory |
| | lon | longitude SOPS DB column type = varchar2(11) | Mandatory |
| | type | 0: WGS84, 1: Bessel, 2: Coord Shift | Mandatory |
| | alt | Altitude | Mandatory |
| | heading | Range between 0~359 | Optional |
| | velocity | Speed | Optional |

Referring to [Table 8], the GPS information of the field includes information on the location where the event occurred, and may comprise lat, lon, type, alt, heading, and velocity.

The lat may comprise latitude information of the point where the event occurred, and may be information necessarily included in the field.

The lon may comprise longitude information of the point where the event occurred, and may be information necessarily included in the field.

The type may comprise information on the type of position information, and may be information necessarily included in the field.

The alt may comprise altitude information of the point where the event occurred, and may be information necessarily included in the field.

The heading may comprise instantaneous driving direction information of a vehicle, and may be information selectively included in the field.

The velocity may comprise vehicle velocity information, and may be information selectively included in the field.

[Table 9] is a table indicating version information of the field.

TABLE 9

| | Field | Description | Attribute |
|---|---|---|---|
| version | software | system software version | mandatory |
| | firmware | system firmware version | mandatory |
| | map | map version | mandatory |
| | navigation | navigation version | mandatory |

Referring to [Table 9], the version information of the field may comprise software, firmware, map, and navigation.

The software may comprise software version information of the system, and may be information necessarily included in the field.

The firmware may comprise firmware version information of the system, and may be information necessarily included in the field.

The map may comprise map information, and may be information necessarily included in the field.

The navigation may comprise version information of the navigation, and may be information necessarily included in the field.

[Table 10] is a table indicating perf information of the field.

TABLE 10

| | Field | Description | Attribute |
|---|---|---|---|
| Perf | loadavg | system load value | mandatory (Other) optional (initialization) |
| | cpu | system CPU usage | mandatory (Other) optional (initialization) |
| | ram | system memory usage (Available Memory) | mandatory (Other) optional (initialization) |
| | storage | system partition usage | mandatory (Other) optional (initialization) |
| | task | process list | mandatory (Other) optional (initialization) |

Referring to [Table 10], the perf information of the field may comprise loadavg, cpu, ram, storage, and task.

The loadavg may comprise information about a system load value.

The cpu may comprise system CPU usage information.

The ram may comprise system memory usage information.

The storage may comprise system partition usage information.

The task may comprise process list information.

The perf information may be selectively included in the field during initialization, and may be information necessarily included in the field in a process other than initialization.

[Table 11] is a table indicating feature information of the field.

TABLE 11

| | Field | Description | Attribute |
|---|---|---|---|
| feature | list | controllable feature list | optional |

Referring to [Table 11], the feature information of the field may comprise list information and may comprise service list information capable of on-off in the vehicle. The feature information of the field may be information selectively included in the field.

As described above, in S404, the terminal log manager 152 may be configured to generate event status data in response to event detection. The event status data may comprise an error level and log information of an event in addition to the information included in [Table 4] to [Table 11].

In S405, the terminal log manager 152 may be configured to generate event status data based on event storage information obtained from a user input.

In S406, the terminal log manager 152 may be configured to transmit the event status data to the first server 200.

In S407, the first server 200 may be configured to determine whether to collect the log based on the event status data.

To this end, the first server 200 may be configured to determine the protocol of the field from the received event status data. The first server 200 may be configured to determine whether there is a log collection restriction condition related to the event based on the protocol of the field in the event status data. The log collection restriction condition related to the event may be the size of the log, the generation history of the issue report, or whether the protocol version information matches.

For example, the first server 200 may be configured to identify the size of the log based on logsize information of the protocol. The first server 200 may be configured to restrict the collection of logs based on that the log size is greater than or equal to a threshold size.

Alternatively, the first server 200 may be configured to identify the generation history of the issue report related to the event status data through the jira information of the protocol. When the Jira title is identified based on the jira, the first server 200 may be configured to determine that there is a history of generating an issue report with respect to the received event status data. That is, the first server 200 may be configured to restrict the log collection based on the existence of a history of issue reports with respect to the event.

Alternatively, the first server 200 may be configured to identify the version of the communication protocol through which the vehicle communicates with the outside based on the protocol version information. The first server 200 may be configured to restrict log collection when the protocol version is no longer used or not supported by the server.

As such, the first server 200 may be configured to determine whether there is the log collection restriction condition with respect to the event. The log collection restriction condition according to an exemplary embodiment of the present disclosure may vary depending on embodiments. For example, a log collection restriction condition may be added in response to a situation in which it is not necessary to generate the issue report. Alternatively, an exemplary embodiment in which one or more of the three log collection restriction conditions described above is omitted may be used.

In S408, the first server 200 may be configured to determine log collection when log collection restriction condition is not met in S407. In addition, when there is no log collection restriction condition in the event status data, the first server 200 may be configured to request log transmission from the terminal log manager 152.

In S409, the terminal log manager 152 may be configured to transmit the log in response to the log transmission request from the first server 200. That is, the terminal log manager 152 may be configured to transmit the log collected in S404 and S405 to the first server 200 in response to event detection.

In S410, the first server 200 may be configured to receive the log related to the event and store the received log.

In S411, the first server 200 may be configured to transmit a response message ACK notifying that log reception is complete to the terminal log manager 152.

In S412, the first server 200 may be configured to request the second server 300 to generate a ticket so as to generate issue data.

In S413, the second server 300 may be configured to generate a Jira ticket, and in S414, issue a ticket ID to the first server 200.

In S415, the first server 200 may be configured to transmit the event status data to the second server 300.

In S416, the second server 300 may be configured to generate an issue report based on the event status data.

In S417, the second server 300 may be configured to transmit a status code related to the generated issue report to the first server 200.

FIG. 4 illustrates an exemplary embodiment of generating an issue report using JIRA, which is a conventional technology. In an exemplary embodiment of the present disclosure, the means for generating an issue report is not limited to the Jira, and the Jira-based second server 300 may be implemented in a form integrated into the first server 200.

Figure 5:
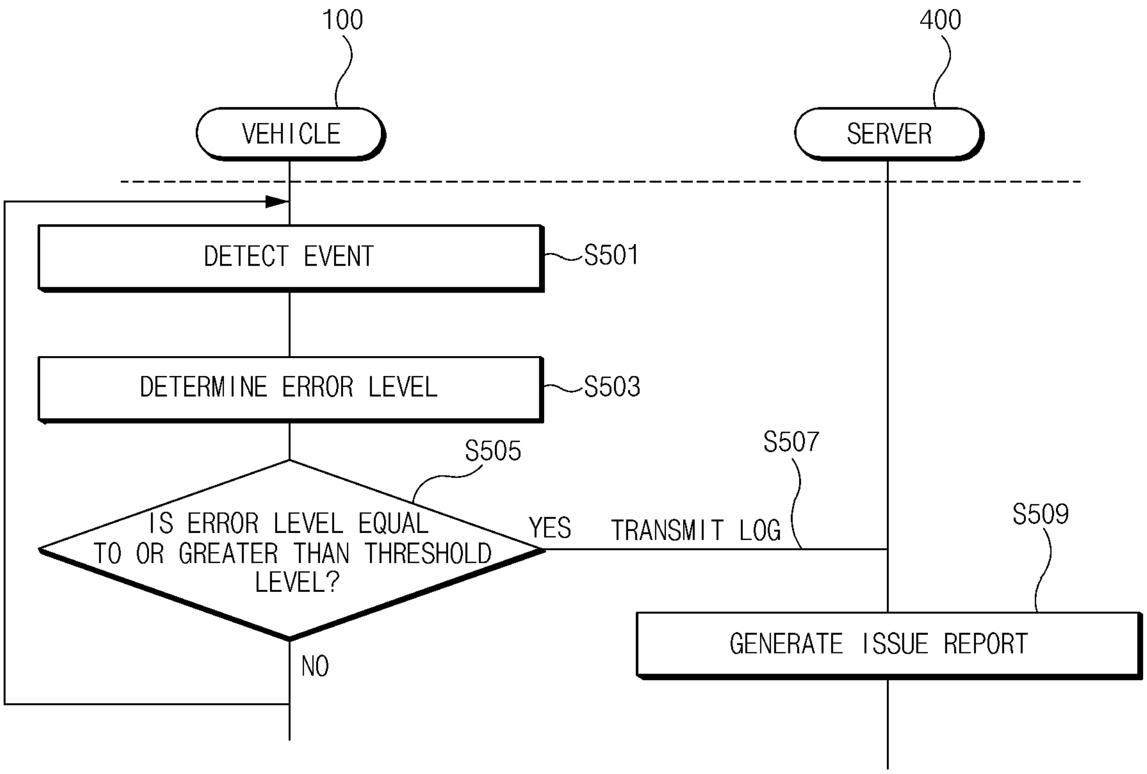
FIGS. 5 and 6 are diagrams illustrating an exemplary embodiment of a method of transmitting event status data according to an error level.
Figure 6:
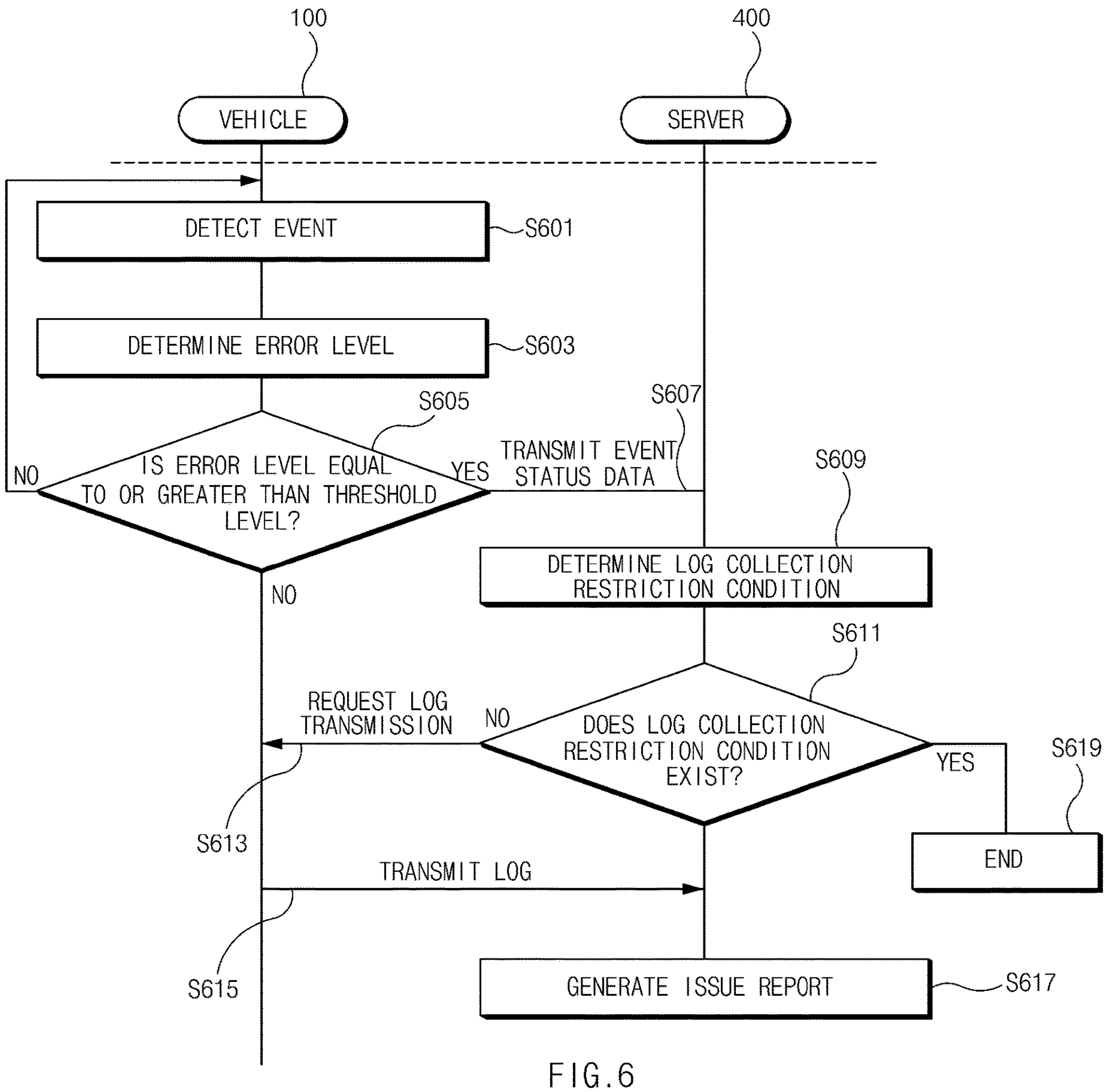

FIGS. 5 and 6 are diagrams illustrating an exemplary embodiment of a method of transmitting event status data according to an error level. FIGS. 5 and 6 will be mainly described with respect to an exemplary embodiment in which the first and second servers are integrated.

Referring to FIG. 5, a method of transmitting event status data according to an exemplary embodiment of the present disclosure will be described as follows.

In S501, the vehicle 100 may be configured to detect an event. According to an exemplary embodiment, the terminal task 151 of the vehicle 100 may be configured to detect an event based on a manual report or an automatic report.

In S503, the vehicle 100 may be configured to determine the error level of an event. According to an exemplary embodiment, the terminal log manager 152 of the vehicle 100 may be configured to determine an error level matched with the event.

In S505, the vehicle 100 may be configured to determine whether the error level of the event is equal to or greater than a threshold level. According to an exemplary embodiment, the terminal log manager 152 of the vehicle 100 may be configured to determine whether the error level matched with the event is equal to or greater than the preset threshold level.

In S507, the vehicle 100 may be configured to transmit the log to the server 400 based on that the error level is equal to or greater than the threshold level.

In S509, the server 400 may be configured to generate an issue report based on the log received from the vehicle 100.

As described with reference to FIG. 5, whether to generate an issue report may be determined based on the error level. That is, as in the embodiment illustrated in FIG. 5, the log collection restriction condition may not be involved in determining whether to generate the issue report.

Referring to FIG. 6, a method of transmitting event status data according to another embodiment of the present disclosure will be described as follows.

In S601, the vehicle 100 may be configured to detect an event. According to an exemplary embodiment, the terminal task 151 of the vehicle 100 may be configured to detect an event based on a manual report or an automatic report.

In S603, the vehicle 100 may be configured to determine the error level of an event. According to an exemplary embodiment, the terminal log manager 152 of the vehicle 100 may be configured to determine an error level matched with the event.

In S605, the vehicle 100 may be configured to determine whether the error level of the event is equal to or greater than a threshold level. According to an exemplary embodiment, the terminal log manager 152 of the vehicle 100 may be configured to determine whether the error level matched with the event is equal to or greater than the preset threshold level.

In S607, the vehicle 100 may be configured to transmit the event status data to the server 400 based on that the error level of the event is equal to or greater than the threshold level.

In S609, the server 400 may be configured to identify whether there is a log collection restriction condition in the event status data received from the vehicle 100.

In S611 and S613, the server 400 may be configured to request log transmission from the vehicle 100 based on the existence of a log collection restriction condition in the event status data.

The log collection restriction condition may comprise a case in which the log size is greater than or equal to a threshold size. Alternatively, the log collection restriction condition may comprise a case in which a generation history of the issue report matched with the event exists. Alternatively, the log collection restriction condition may comprise a case in which the version of the communication protocol is not supported.

In S615, the vehicle 100 may be configured to transmit the log to the server 400 in response to the log transmission request from the server 400.

In S617, the server 400 may be configured to generate the issue report based on the log received from the vehicle 100.

As illustrated in FIG. 6, whether to generate the issue report may consider both the error level and the log collection restriction condition. That is, the issue report may be generated only when the error level is equal to or greater than the threshold level and there is no log collection restriction condition.

Figure 7:
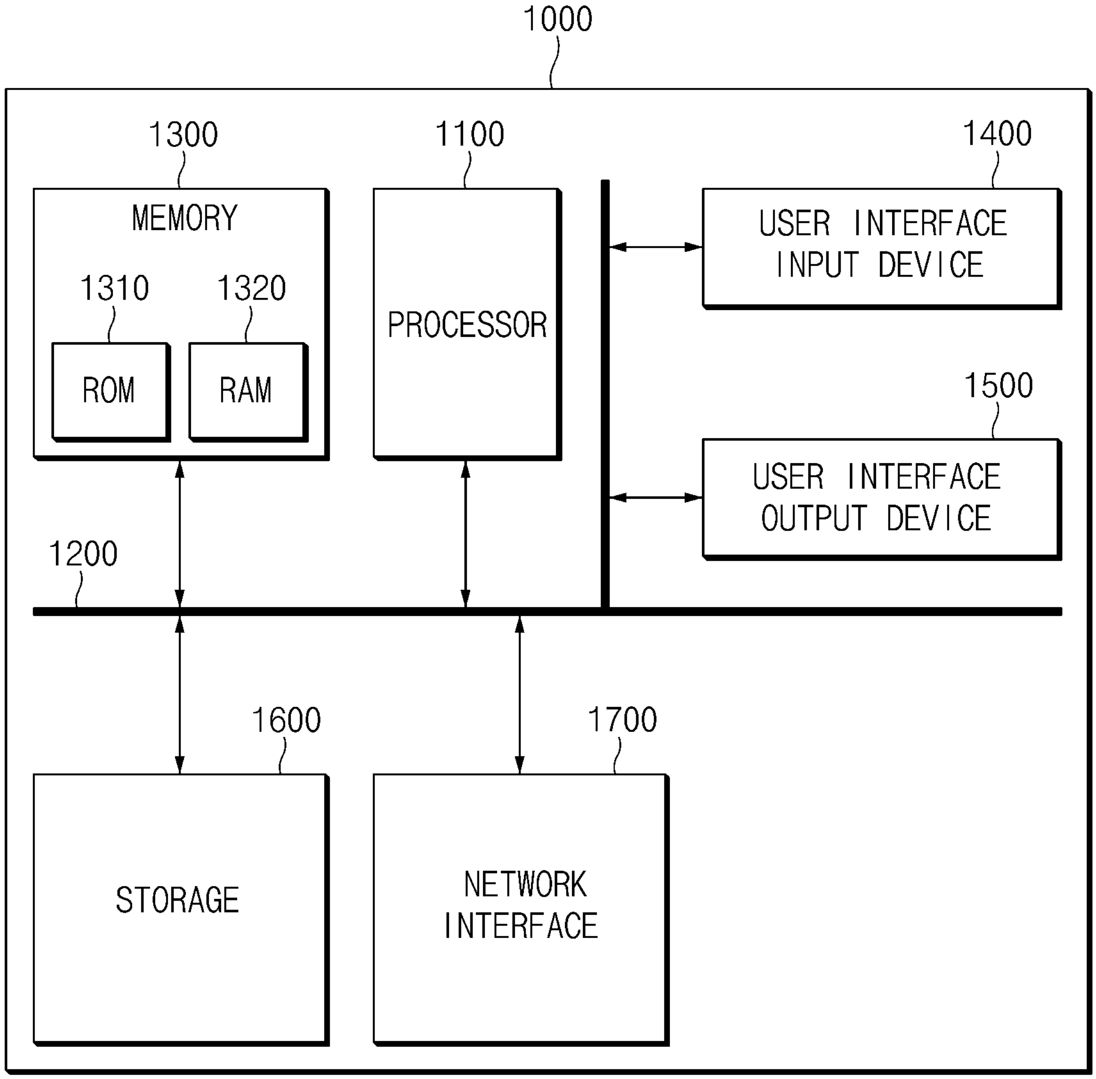
FIG. 7 is a diagram illustrating a computing system according to an exemplary embodiment of the present disclosure.

FIG. 7 is a diagram illustrating a computing system according to an exemplary embodiment of the present disclosure.

Referring to FIG. 7, a computing system 1000 may comprise at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. In detail, the processor 1100 may comprise the monitoring device 150 illustrated in FIG. 2. Each of the memory 1300 and the storage 1600 may comprise various types of volatile or nonvolatile storage media. For example, the memory 1300 may comprise a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may be configured to read out information from the storage medium and may be configured to write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an exemplary embodiment of the present disclosure, based on the events that occur according to the conditions, the log is analyzed without the user's intervention, so it is possible to more quickly determine an anomaly sign in a vehicle.

According to an exemplary embodiment of the present disclosure, since the log may be analyzed based on remote wireless communication, it is possible to more easily determine an anomaly sign in a vehicle.

According to an exemplary embodiment of the present disclosure, since an anomaly sign in a vehicle is determined based on the level of the event condition, it is possible to easily determine the reduction of the anomaly sign in a vehicle.

According to an exemplary embodiment of the present disclosure, since log analysis is decided based on the additional information of the log, the load required for log analysis may be reduced.

In addition, various effects directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A vehicle monitoring apparatus, comprising:

one or more memory configured to store a predetermined generation condition of a predetermined event generated by an anomaly sign of the vehicle and a predetermined error level, wherein the predetermined error level is used to determine whether to collect a log matched with the predetermined event;

a terminal task including a processor configured to:

monitor at least one of a protocol, a system, or an application of a vehicle;

determine occurrence of the predetermined event based on detecting the predetermined generation condition in the protocol, the system, or the application; and a terminal log manager including a processor and configured to:

extract the predetermined error level matched with the predetermined event from the memory, in response to detecting the predetermined event;

generate event status data comprising the extracted predetermined error level and the extracted predetermined event;

receive a log transmission request from an external server;

transmit event status data without the log, determine the extracted predetermined error level of the extracted predetermined event; and transmit, in response to receipt of the log transmission request, the log matched with the event when the error level is greater than or equal to a threshold value;

wherein the log transmission request is generated by the server based on that a generation history of the issue report does not exist.

2. The vehicle monitoring apparatus of claim 1, wherein the terminal task is further configured to determine the predetermined event based on a user input through a user input device.

3. The vehicle monitoring apparatus of claim 2, wherein the terminal log manager is further configured to request the event status data from a user after confirming the user input.

4. A server for monitoring a vehicle, comprising:

a log manager including a processor and configured to:

transmit a log transmission request to a vehicle;

receive event status data generated by extracting a predetermined error level, wherein the error level is used to determine whether to collect a log matched with a predetermined event generated by an anomaly sign of the vehicle from a memory in the vehicle when a predetermined generation condition occurs in the vehicle; and determine whether to collect a log matched with the event based on the error level; and an issue report generator including a processor and configured to generate an issue report based on the log received from the vehicle;

wherein the predetermined event is determined when the predetermined generation condition is detected in at least one of a protocol, a system, or an application of the vehicle;

wherein the event status data comprises the predetermined error level and the predetermined event;

wherein the log manager is further configured to receive, from the vehicle, the log when the error level is greater than or equal to a threshold value; and wherein the log manager is further configured to request the vehicle to transmit the log when a generation history of the issue report does not exist.

5. The server for monitoring the vehicle of claim 4, wherein the log manager is further configured to request the vehicle to transmit the log when a size of the log is less than a preset threshold size.

6. The server for monitoring the vehicle of claim 4, wherein the log manager is further configured to request the vehicle to transmit the log when version information related to the log is supported.

7. A method of monitoring of a vehicle, the method comprising:

monitoring, by a processor in a vehicle, at least one of a protocol, a system, or an application of a vehicle;

determining, by the processor, a predetermined event based on detecting a predetermined generation condition, wherein the predetermined generation condition is detected by using a memory in the vehicle that stores the predetermined generation condition of the predetermined event generated by an anomaly sign of the vehicle and a predetermined error level, wherein the predetermined error level is used to determine whether to collect a log matched with the predetermined event;

generating, by the processor in response to detecting the predetermined event, the error level matched with the event;

generating, by the processor, predetermined event status data comprising the error level and the event;

receiving, by the processor, a log transmission request from an external server;

determining, by the processor, the error level of the event;

determining, by the external server, whether to collect a log matched with the event, based on the error level; and generating, by the external server, an issue report, based on the log, wherein the collecting the event status data comprise comprises collecting information on a generation history of the issue report related to the event, and wherein the determining whether to collect the log comprises restricting the log collection based on an existence of the generation history of the issue report.

8. The method of claim 7, wherein the determining of the predetermined event is performed based on confirming a user input from a user.

9. The method of claim 8, wherein the generating of the predetermined event status data comprises requesting information related to the predetermined event status data from the user after confirming the user input.

10. The method of claim 7, wherein:

the generating of the predetermined event status data comprises collecting information related to a size of the log, and the determining whether to collect the log comprises restricting the log collection when the size of the log is greater than or equal to a preset threshold size.

11. The method of claim 7, wherein:

the generating of the predetermined event status data comprises identifying version information related to the log, and the determining whether to collect the log comprises restricting the log collection based on that version information related to the log is not supported.

12. The method of claim 7, wherein the determining whether to collect the log comprises collecting the log when the error level is greater than or equal to a threshold value.

* * * * *